US 6,936,671 B2
(45) Date of Patent: Aug. 30, 2005

(12) United States Patent
Mehta et al.

(10) Patent No.: US 6,936,671 B2

(54) PROCESS FOR COPOLYMERIZING ETHYLENE WITH VINYLSILANES

(75) Inventors: Sameer D. Mehta, Mason, OH (US); Mark K. Reinking, Mason, OH (US)

(73) Assignee: Equistar Chemicals, LP, Houston, TX (US)

(*) Notice: Subject to any disclaimer, the term of this patent is extended or adjusted under 35 U.S.C. 154(b) by 21 days.

(21) Appl. No.: 10/681,657

(22) Filed: Oct. 8, 2003

(65) Prior Publication Data

US 2005/0080208 A1 Apr. 14, 2005

(51) Int. Cl.$^7$ ............................................. C08F 130/08
(52) U.S. Cl. .................... 526/279; 526/352; 526/124.2; 526/124.3; 526/110
(58) Field of Search ................. 526/279, 352, 526/124.2, 124.3, 110

(56) References Cited

U.S. PATENT DOCUMENTS

| | | | | |
|---|---|---|---|---|
| 3,225,018 A | | 12/1965 | Zutty .......................... | 260/88.1 |
| 3,392,156 A | * | 7/1968 | Donaldson .................. | 526/227 |
| 4,464,518 A | | 8/1984 | Iwabuchi et al. ........... | 526/127 |
| 4,900,706 A | | 2/1990 | Sasaki et al. ............... | 502/116 |
| 4,902,460 A | | 2/1990 | Yagi et al. .................. | 264/83 |
| 5,275,993 A | | 1/1994 | Fujita et al. ................ | 502/127 |
| 5,595,827 A | | 1/1997 | Yamada et al. ............. | 428/516 |
| 6,337,377 B1 | | 1/2002 | Ebara et al. ................ | 526/124.6 |
| 6,359,667 B1 | | 3/2002 | Koyanagi et al. .......... | 349/55 |
| 6,362,124 B1 | | 3/2002 | Kuribayashi et al. ....... | 502/116 |
| 6,465,107 B1 | | 10/2002 | Kelly .......................... | 428/447 |
| 6,559,250 B2 | | 5/2003 | Ro et al. .................... | 526/124.3 |

FOREIGN PATENT DOCUMENTS

JP   04-239527   *   8/1992

OTHER PUBLICATIONS

M. Härkönen, J. V. Seppälä and T. Väänänen, *Makromol. Chem.* 192 (1991) 721.
Y. V. Kissin, *J. Polym. Sci. Part A: Polym. Chem.*, 33 (1995) 227.

* cited by examiner

*Primary Examiner*—Ling-Sui Choi
(74) *Attorney, Agent, or Firm*—John Tyrell; Jonathan L. Schuchardt

(57) ABSTRACT

A process for copolymerizing ethylene with vinylsilanes is disclosed. The process uses a Ziegler-Natta catalyst and cocatalyst wherein the Ziegler-Natta catalyst is prepared from a Group 4–6 halogen-containing transition metal and a mixture of an organomagnesium compound and a silicon-containing compound. Silane-functionalized polyolefins produced using the process can be crosslinkable and can be used to bond polyolefins to polysiloxanes or other functionalized polymers.

11 Claims, No Drawings

US 6,936,671 B2

PROCESS FOR COPOLYMERIZING ETHYLENE WITH VINYLSILANES

FIELD OF THE INVENTION

The invention relates to a process for making ethylene copolymers. The process, which uses a Ziegler-Natta catalyst prepared from the reaction of a transition metal compound with a mixture of an organomagnesium compound and a silicon-containing compound, is valuable for producing copolymers of ethylene and vinylsilanes.

BACKGROUND OF THE INVENTION

Ziegler-Natta catalysts are a mainstay for polyolefin manufacture. Much research has been done since their inception and there are many types of Ziegler-Natta catalysts. One useful Ziegler-Natta catalyst is disclosed in U.S. Pat. No. 4,464,518. It is made from the reaction product of a halogen-containing vanadium or titanium compound with a mixture of an organomagnesium compound and a silicon-containing compound. The catalyst and cocatalyst are described as being useful for ethylene polymerizations and ethylene copolymerizations with alpha-olefins such as propylene, 1-butene, 1-hexene or 1-octene. There is no indication that this catalyst would be effective for the copolymerization of ethylene with other types of olefins.

Silicon compounds have been used as donors with Ziegler-Natta catalysts. M. Harkonen, J. V. Seppala and T. Vaananen, *Makromol. Chem.* 192 (1991) 721 report that external donors markedly increase the sterospecificity and usually decrease the activity of Ziegler-Natta catalysts and that the generally accepted view of the role of the donor is a selective deactivation of active centers. Y. V. Kissin, *J. Polym. Sci. Part A: Polym. Chem.*, 33 (1995) 227, reports a series of ethylene-hexene copolymerization experiments with varying amounts of diphenyldimethoxysilane. Increasing levels of silane decreased the 1-hexene incorporation and they concluded that the silanes poison different catalytic centers to different degrees.

There are many other instances of the use of low levels of silicon compounds as electron donors to modify a Ziegler-Natta catalyst. See, e.g., U.S. Pat. Nos. 6,559,250; 6,359,667; 6,362,124; 6,337,377; 5,595,827; and 4,900,706. The silicon compounds are often alkoxysilanes and can include vinylalkoxysilanes. The vinyl group is not required for the alkoxysilane to act as a catalyst donor. The silicon compounds are not used as comonomers and there is no indication that there could be any incorporation into the polymer chain.

U.S. Pat. No. 5,275,993 teaches a solid component for a Ziegler-Natta catalyst and the modification of the solid component with several components other than the essential titanium, magnesium and halogen components. Electron donors, silicon compounds, vinylsilane compounds and organoaluminum compounds are listed as possible modifiers. The vinylsilane is not used as a comonomer and there is no indication that there could be any incorporation into the polymer chain.

Copolymers of ethylene with vinylsilanes are known. U.S. Pat. Nos. 3,225,018 and 3,392,156 disclose free-radical copolymerizations under high pressure and temperature in the presence of a free-radical initiator. U.S. Pat. No. 3,225,018 teaches that the copolymerizations are generally conducted at pressures of 69 to 690 MPa and that the resultant copolymers can be crosslinked. U.S. Pat. No. 3,392,156 teaches reaction pressures of 103 to 310 MPa and that the copolymers have improved stress-crack resistance.

Another approach has been to graft vinylsilanes to polyolefins by heating them together in the presence of radical initiators such as peroxides. See, e.g., U.S. Pat. Nos. 6,465,107 and 4,902,460. These methods are difficult, have certain process hazards, can cause degradation of the polyolefin chain, and have limited flexibility to make a variety of polymers.

Incorporating silane functionality into polyolefins can impart crosslinkability for polyolefin products with improved strength and stiffness. It is also valuable for modifying flow properties or for bonding polyolefins to polysiloxanes, polyethers, polyurethanes, and other functionalized polymers. Despite the utility of copolymers of ethylene with vinylsilanes, it is apparently difficult to prepare these copolymers as evidenced by so few examples in the literature. The reported processes are limited and require very high pressure. Operating at such high pressure requires special equipment. There is a need for alternative processes to make ethylene-vinylsilane copolymers, preferably ones that work at relatively low pressures.

SUMMARY OF THE INVENTION

The invention is a process for copolymerizing ethylene with a vinylsilane. The process comprises conducting the copolymerization in the presence of a Ziegler-Natta catalyst and a cocatalyst. The Ziegler-Natta catalyst comprises the reaction product of a Group 4–6 halogen-containing transition metal compound with a mixture of an organomagnesium compound and a silicon-containing compound. We surprisingly found that the catalyst and cocatalyst enable the copolymerization of ethylene with vinylsilanes at ordinary temperatures and pressures.

DETAILED DESCRIPTION OF THE INVENTION

In the process of the invention, ethylene is copolymerized with a vinylsilane in the presence of a Ziegler-Natta catalyst and a cocatalyst. The Ziegler-Natta catalyst comprises the reaction product of a Group 4–6 halogen-containing transition metal compound with a mixture of an organomagnesium compound and a silicon-containing compound. Preferably, the transition metal is Ti or V and more preferably the transition metal is Ti. Suitable halogen-containing transition metal compounds include $TiCl_4$, $TiCl(OCH_2CH_3)_3$, $VOCl_3$, $VCl_4$ and the like.

The organomagnesium compound is preferably a Grignard reagent, more preferably an alkylmagnesium halide and most preferably an alkylmagnesium chloride. Suitable organomagnesium compounds include diethylmagnesium, ethylmagnesium bromide, butylmagnesium chloride and the like. The organomagnesium compound is mixed with a silicon-containing compound. Preferably, the silicon-containing compound is a hydroxysilane or a polyhydrosiloxane. Suitable hydroxysilanes include trimethylhydroxysilane, methyldiphenylhydroxysilane, dipropyldihydroxysilane, butyltrihydroxysilane and the like. More preferably, the silicon-containing compound is a polyhydrosiloxane. Suitable polyhydrosiloxanes include polymethylhydrosiloxane, tetramethylcyclotetrasiloxane, dihydropolysiloxane and the like. Most preferably, the silicon-containing compound is polymethylhydrosiloxane.

The mixing of the organomagnesium compound with the silicon-containing compound is preferably done in a solvent and preferably at a time and temperature to enable a reaction to take place between them. Tetrahydrofuran is a convenient solvent but other solvents and combinations of solvents may be used. The time and temperature can be varied. Typically, the reaction is complete after several hours at room temperature, but the reaction can be performed in a shorter time at a higher temperature. One hour in refluxing tetrahydrofuran is convenient and gives good results.

Preferably, the mixture of the organomagnesium compound with the silicon-containing compound is pre-reacted with a mixture of an aluminum compound and an alcohol prior to combining with the halogen-containing transition metal compound. Suitable aluminum compounds include alkyl aluminum halides such as diethyl aluminum chloride, diisobutyl aluminum chloride, ethyl aluminum dichloride and the like. Suitable alcohols include straight chain aliphatic alcohols such as methanol or n-hexanol, branched chain aliphatic alcohols such as isopropanol or 2-ethylhexanol or cyclic alcohols such as cyclohexanol or 3-methylcyclopentanol and mixtures thereof. Preferably, the alcohol is a mixture of a straight chain aliphatic alcohol with either a branched chain aliphatic alcohol or a cyclic aliphatic alcohol.

Preferred Ziegler-Natta catalysts and methods for their preparation are described in U.S. Pat. No. 4,464,518, which is incorporated herein by reference.

The cocatalyst is selected from the group consisting of trialkyl aluminum, dialkyl aluminum halide, and alkyl aluminum dihalide. Suitable cocatalysts include triethyl aluminum, triisobutyl aluminum, diethyl aluminum chloride and butyl aluminum dichloride and the like and mixtures thereof.

Ethylene is copolymerized with a vinylsilane. Preferably, the vinylsilane is a vinyltrialkylsilane such as vinyltrimethylsilane, a vinylalkylalkoxysilane such as vinylmethyldiethoxysilane or vinyldimethylethoxysilane or more preferably, a vinyltrialkoxysilane such as vinyltriethoxysilane or vinyltrimethoxysilane.

Preferably, the vinylsilane has the general structure:

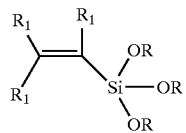

in which each $R_1$ is independently selected from hydrogen, halogen, and $C_1$–$C_{20}$ hydrocarbyl and each R is independently selected from $C_1$–$C_{20}$ hydrocarbyl. More preferably, $R_1$ is hydrogen and each R is independently selected from $C_1$–$C_6$ hydrocarbyl.

Preferably the vinylsilane is added at a level of from about 50 micromoles to about 5,000 micromoles per gram of polyolefin produced, more preferably from about 100 micromoles to about 3,000 micromoles per gram of polyolefin produced.

Optionally, ethylene and the vinylsilane are copolymerized with a third olefin. Preferred third olefins are propylene, 1-butene, 1-pentene, 1-hexene, 1-octene and mixtures thereof.

While there are many ways to practice the ethylene copolymerization process of the invention, the process is preferably a slurry or gas-phase process.

The polymerizations can be performed over a wide temperature range, such as about −30° C. to about 280° C. A more preferred range is from about 20° C. to about 180° C.; most preferred is the range from about 30° C. to about 100° C. Olefin partial pressures normally range from about 0.1 MPa to about 350 MPa. More preferred is the range from about 0.3 MPa to about 25 MPa. Most preferred is the range from about 0.5 MPa to about 4 MPa. The ability to operate under such mild conditions of temperature and pressure obviates the need for special equipment.

The following examples merely illustrate the invention. Those skilled in the art will recognize many variations that are within the spirit of the invention and scope of the claims.

Catalyst A

Catalyst A is prepared by reacting n-butylmagnesium chloride with trimethylsilyl-terminated polymethylhydrosiloxane and reacting that product with the reaction product from a mixture of ethanol, isopropanol and diethyl aluminum chloride. This subsequent product is then reacted with titanium tetrachloride to afford catalyst A. The general procedure is described in Example 3 of U.S. Pat. No. 4,464,518. The solid catalyst is not collected but used as a hexane slurry. The hexane slurry contains about $1.95 \times 10^{-3}$ g Ti in 1.0 mL. A portion (1.0 mL) of this hexane slurry is further diluted to 30 mL with mineral oil and used in polymerizations.

EXAMPLE 1

Copolymerization of Ethylene and Vinyltriethoxysilane

A 20 mL steel vessel equipped with a 15 mL glass liner is charged with 5.0 mL heptane, 0.2 mL of a mineral oil slurry of catalyst A (approximate titanium content=$1.3 \times 10^{-5}$ g Ti), 0.1 mL of a solution of 1.56 M triethyl aluminum in heptane, and 0.1 mL of 0.47 M vinyltriethoxysilane (VTEOS) in heptane (47 micromoles vinyltriethoxysilane). The vessel is heated to 80° C. Hydrogen is added to pressurize the vessel to 0.07 MPa and ethylene fed to the vessel to maintain 1.4 MPa. The polymerization proceeds for thirty minutes. The reactor is vented and methanol added. The solvent is evaporated and the polyolefin is collected and dried prior to testing. The reaction yields 0.33 g polyolefin. The weight average ($M_w$) molecular weight and number average ($M_n$) molecular weight of the polymer are measured by gel permeation chromatography (GPC) using 1,3,5-trichlorobenzene at 145° C. to be $1.2 \times 10^6$ g/mole and $1.2 \times 10^5$ g/mole. The melting point and heat of fusion were determined by differential scanning calorimetry to be 133.3° C. and 152 J/g.

EXAMPLES 2–5 AND COMPARATIVE EXAMPLES 6–7

The polymerization procedure of Example 1 is generally followed except the amount of vinyltriethoxysilane is varied. The results are summarized in Table 1.

TABLE 1

| | Polymerizations | | | | | |
|---|---|---|---|---|---|---|
| Ex. | VTEOS (micromoles) | g polyolefin | Mw (× 10⁶) g/mole | Mn (× 10⁵) g/mole | Melting Point ° C. | Heat of Fusion J/g |
| 1 | 47 | 0.33 | 1.2 | 1.2 | 133.3 | 152 |
| 2 | 47 | 0.31 | | | 133.9 | 148 |
| 3 | 240 | 0.15 | 0.43 | 0.39 | 129.9 | 104 |
| 4 | 240 | 0.13 | | | 130.3 | 101 |
| 5 | 470 | 0.18 | | | 119.2 | 17 |
| C6 | 0 | 1.5 | 0.54 | 0.62 | 135.6 | 184 |
| C7 | 0 | 1.5 | 0.45 | 0.42 | 134.1 | 171 |

As the amount of vinyltriethoxysilane (VTEOS) is increased, the melting point decreases and the heat of fusion decreases. This indicates good incorporation of the vinyltriethoxysilane into the ethylene copolymer. The good agreement between Examples 1 and 2 and between Examples 3 and 4 shows the reproducibility of the process. Comparative Examples 6 and 7 have no VTEOS and therefore the polyethylene has a high melting point and high heat of fusion.

The preceding examples are meant only as illustrations. The following claims define the invention.

We claim:

1. A process which comprises copolymerizing ethylene with a vinylsilane in the presence of a Ziegler-Natta catalyst and cocatalyst wherein the vinylsilane has the general structure:

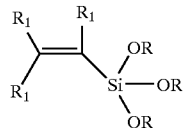

in which each $R_1$ is independently selected from the group consisting of hydrogen, halogen, and $C_1$–$C_{20}$ hydrocarbyl and each R is independently a $C_1$–$C_{20}$ hydrocarbyl; the catalyst comprises the reaction product of a Group 4–6 halogen-containing transition metal compound with a mixture of an organomagnesium compound and a silicon-containing compound; and the cocatalyst is selected from the group consisting of trialkyl aluminums, dialkyl aluminum halides and alkyl aluminum dihalides.

2. The process of claim 1 wherein the mixture of the organomagnesium compound and the silicon-containing compound has been prereacted with a mixture of an aluminum compound and an alcohol.

3. The process of claim 2 wherein the alcohol is a mixture of a straight chain alcohol with a branched or cyclic alcohol.

4. The process of claim 1 wherein the silicon-containing compound is a polymethylhydrosiloxane.

5. The process of claim 1 further comprising the copolymerization of ethylene and the vinylsilane with a third olefin wherein the third olefin is selected from the group consisting of propylene, 1-butene, 1-pentene, 4-methyl-1-pentene, 1-hexene and 1-octene and mixtures thereof.

6. The process of claim 1 wherein $R_1$ is hydrogen and each R is independently a $C_1$–$C_6$ hydrocarbyl.

7. The process of claim 1 wherein the polymerization is performed at a temperature within the range of about 30° C. to about 100° C.

8. The process of claim 1 wherein the polymerization is performed at a pressure within the range of about 0.3 MPa to about 25 MPa.

9. The process of claim 1 wherein the vinylsilane is used in an amount from about 100 micromoles to about 3,000 micromoles per gram of polyolefin produced.

10. A slurry polymerization process of claim 1.

11. A gas-phase polymerization process of claim 1.

* * * * *